(12) United States Patent
Zhu et al.

(10) Patent No.: US 11,928,473 B2
(45) Date of Patent: Mar. 12, 2024

(54) INSTRUCTION SCHEDULING METHOD AND SYSTEM FOR RECONFIGURABLE ARRAY PROCESSOR

(71) Applicant: Beijing Tsingmicro Intelligent Technology Co., Ltd., Beijing (CN)

(72) Inventors: Kejia Zhu, Beijing (CN); Zhen Zhang, Beijing (CN); Peng Ouyang, Beijing (CN)

(73) Assignee: BEIJING TSINGMICRO INTELLIGENT TECHNOLOGY CO., LTD., Beijing (CN)

( * ) Notice: Subject to any disclaimer, the term of this patent is extended or adjusted under 35 U.S.C. 154(b) by 87 days.

(21) Appl. No.: 17/701,174

(22) Filed: Mar. 22, 2022

(65) Prior Publication Data

US 2022/0214883 A1 Jul. 7, 2022

Related U.S. Application Data

(63) Continuation of application No. PCT/CN2021/073393, filed on Jan. 22, 2021.

(30) Foreign Application Priority Data

Sep. 29, 2020 (CN) .......................... 202011053339.X

(51) Int. Cl.
| | | |
|---|---|---|
| G06F 11/34 | (2006.01) | |
| G06F 9/30 | (2018.01) | |
| G06F 9/38 | (2018.01) | |
| G06F 9/48 | (2006.01) | |

(52) U.S. Cl.
CPC ........ G06F 9/3836 (2013.01); G06F 9/30101 (2013.01); G06F 9/30145 (2013.01); G06F 9/4837 (2013.01)

(58) Field of Classification Search
None
See application file for complete search history.

(56) References Cited

U.S. PATENT DOCUMENTS

| | | | | |
|---|---|---|---|---|
| 7,577,821 | B2 * | 8/2009 | Ikeda ................. | G06F 15/7867 712/15 |
| 8,169,440 | B2 * | 5/2012 | Stuttard ............... | G06F 9/3885 345/519 |
| 11,003,568 | B2 * | 5/2021 | Smith ................. | G06F 11/0793 |

(Continued)

*Primary Examiner* — Hyun Nam
(74) *Attorney, Agent, or Firm* — Hodgson Russ LLP

(57) ABSTRACT

An instruction scheduling method and an instruction scheduling system for a reconfigurable array processor. The method includes: determining whether a fan-out of a vertex in a data flow graph (DFG) is less than an actual interconnection number of a processing unit in a reconfigurable array; establishing a corresponding relationship between the vertex and a correlation operator of the processing unit; introducing a register to a directed edge, acquiring a retiming value of each vertex; arranging instructions in such a manner that retiming values of the instruction vertexes are in ascending order, and acquiring transmission time and scheduling order of the instructions; folding the DFG, placing an instruction to an instruction vertex; inserting a register and acquiring a current DFG; and acquiring a common maximum subset of the current DFG and the reconfigurable array by a maximum clique algorithm, and distributing the instructions.

11 Claims, 4 Drawing Sheets

(56) References Cited

U.S. PATENT DOCUMENTS

| | | | | |
|---|---|---|---|---|
| 11,175,922 B1* | 11/2021 | Etsion | ............ | G06F 9/3836 |
| 2015/0106596 A1* | 4/2015 | Vorbach | ............ | G06F 9/3877 |
| | | | | 712/221 |
| 2019/0102338 A1* | 4/2019 | Tang | ............ | G06F 9/30145 |
| 2020/0097389 A1* | 3/2020 | Smith | ............ | G06F 11/0793 |
| 2021/0334106 A1* | 10/2021 | Etsion | ............ | G06F 13/4027 |
| 2023/0368371 A1* | 11/2023 | Ma | ............ | G06V 10/82 |

* cited by examiner

INSTRUCTION SCHEDULING METHOD AND SYSTEM FOR RECONFIGURABLE ARRAY PROCESSOR

CROSS-REFERENCE TO RELATED APPLICATIONS

This application is a continuation of International Application No. PCT/CN2021/073393, filed on Jan. 22, 2021, which claims priority to Chinese Patent Application Serial No. 202011053339.X, filed on Sep. 29, 2020, the entire contents of which are incorporated herein by reference.

FIELD

The present disclosure relates to a field of hardware architecture compilers, and more particularly to an instruction scheduling method and system for a reconfigurable array processor.

BACKGROUND

Normally, a reconfigurable array is composed of some processing units with the same operation function. The operation function that the processing unit is able to implement is called an operator. An operation unit may contain multiple operators, and different operation functions may be realized by different configuration instructions. Scheduling and transmitting of the configuration instructions may affect the performance of the reconfigurable array.

In the existing scheduling method, instruction scheduling is divided into multiple stages, and the designability of the algorithm is reduced. It requires a designer to have a solid hardware knowledge to design a well-functioned single-stage algorithm, and the multiple stages brings complexity to the design. In addition, the final scheduling performance may be affected by any stage.

SUMMARY

Embodiments of the present disclosure seek to solve at least one of the problems existing in the related art to at least some extent.

An object of the present disclosure is to provide an instruction scheduling method and system for a reconfigurable array processor.

In order to achieve the above-mentioned object, the technical solutions are as follows.

In a first aspect of the present disclosure, an instruction scheduling method for a reconfigurable array processor is provided. The instruction scheduling method includes:
  determining whether a fan-out of a vertex in a data flow graph is less than an actual interconnection number of a processing unit in a reconfigurable array, wherein the vertex in the data flow graph is an instruction vertex;
  establishing a corresponding relationship between the vertex in the data flow graph and a correlation operator of the processing unit in the reconfigurable array, and forming a retiming inequality set, in response to the fan-out of the vertex in the data flow graph being less than the actual interconnection number of the processing units in the reconfigurable array;
  introducing a register required for labeling the operator to a directed edge in the data flow graph according to a solution of the inequality set, acquiring a retiming value of each vertex in the data flow graph, to allow each vertex to be transformed into a model of the processing unit;
  arranging instructions corresponding to the instruction vertexes in such a manner that retiming values of the instruction vertexes are in ascending order, and acquiring transmission time and scheduling order of the instructions;
  folding the data flow graph according to an initial iteration period of the data flow graph, and in response to the number of instruction vertexes of the data flow graph transmitted in parallel at a first time being greater than the number of connected units of the processing unit in the reconfigurable array, placing an instruction with a smallest dependent number to an instruction vertex corresponding to a time after the first time, wherein a dependent number is the number of instructions previously transmitted;
  if all times meet a constraint, in response to a transmission time interval between one or more instruction vertexes and a previous dependent instruction vertex thereof being greater than a preset time interval, inserting a register before the one or more instruction vertexes and the previous dependent instruction vertex thereof and acquiring a current data flow graph, wherein the number of registers corresponds to an iteration period and a time interval; and acquiring a common maximum subset of the current data flow graph and the reconfigurable array by a maximum clique algorithm according to the current data flow graph, and distributing the instructions corresponding to the instruction vertexes in response to a maximum subset number being equal to the number of the vertexes in the data flow graph.

In a second aspect of embodiments of the present disclosure, an instruction scheduling system for a reconfigurable array processor is provided. The instruction scheduling system includes:
  a hardware resource checking unit, configured to determine whether a fan-out of a vertex in a data flow graph is less than an actual interconnection number of a processing unit in a reconfigurable array, wherein the vertex in the data flow graph is an instruction vertex;
  a retiming processing unit, configured to:
  establish a corresponding relationship between the vertex in the data flow graph and a correlation operator of the processing unit in the reconfigurable array, and form a retiming inequality set, and
  introduce a register required for labeling the operator to a directed edge in the data flow graph according to a solution of the inequality set, acquire a retiming value of each vertex in the data flow graph, to allow each vertex to be transformed into a model of the processing unit;
  an instruction ranking unit, configured to arrange instructions corresponding to the instruction vertexes in such a manner that retiming values of the instruction vertexes are in ascending order, and acquire transmission time and scheduling order of the instructions;
  a resource checking unit, configured to:
  fold the data flow graph according to an initial iteration period of the data flow graph, and in response to the number of instruction vertexes of the data flow graph transmitted in parallel at a first time being greater than the number of connected units of the processing unit in the reconfigurable array, place an instruction with a smallest dependent number to an instruction vertex corresponding to a time after the first time, wherein a dependent number is the number of instructions previously transmitted, and if all times meet a constraint, in response to a transmission time interval between one or more instruction vertexes and a previous dependent instruction vertex thereof being greater than a preset time interval, insert a register before the one or more instruction vertexes and the previous dependent instruction vertex thereof and acquire a current data flow graph, wherein the number of registers corresponds to an iteration period and a time interval; and an instruction distributing unit, configured to acquire a common maximum subset of the current data flow graph and the reconfigurable array by a maximum clique algorithm according to the current data flow graph, and distribute the instructions corresponding to the instruction vertexes in response to a maximum subset number being equal to the number of the vertexes in the data flow graph.

In a third aspect of embodiments of the present disclosure, the present disclosure provides a non-transitory computer-readable storage medium having stored therein instructions that, when executed by a processor, are configured to perform the instruction scheduling method as described above.

BRIEF DESCRIPTION OF THE DRAWINGS

These and other aspects and advantages of embodiments of the present disclosure will become apparent and more readily appreciated from the following descriptions made with reference to the drawings.

DETAILED DESCRIPTION

Figure 1:
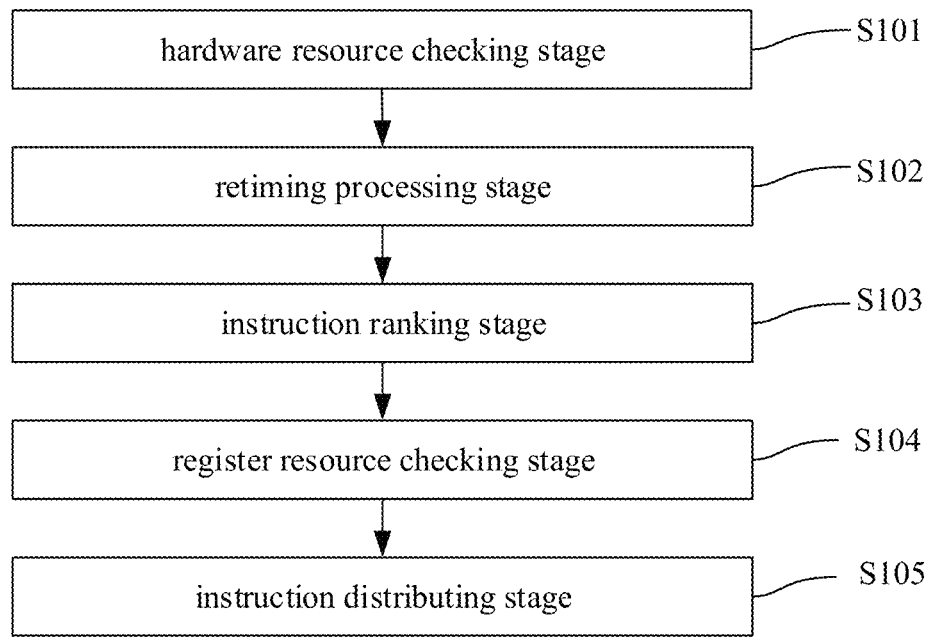
FIG. 1 is a flow chart of an instruction scheduling method according to an embodiment of the present disclosure.

Embodiments of the present disclosure are described in detail below, examples of which are illustrated in the drawings. The same or similar elements are denoted by same reference numerals in different drawings unless indicated otherwise. The embodiments described herein with reference to drawings are explanatory, and used to generally understand the present disclosure. The embodiments shall not be construed to limit the present disclosure.

Figure 2:
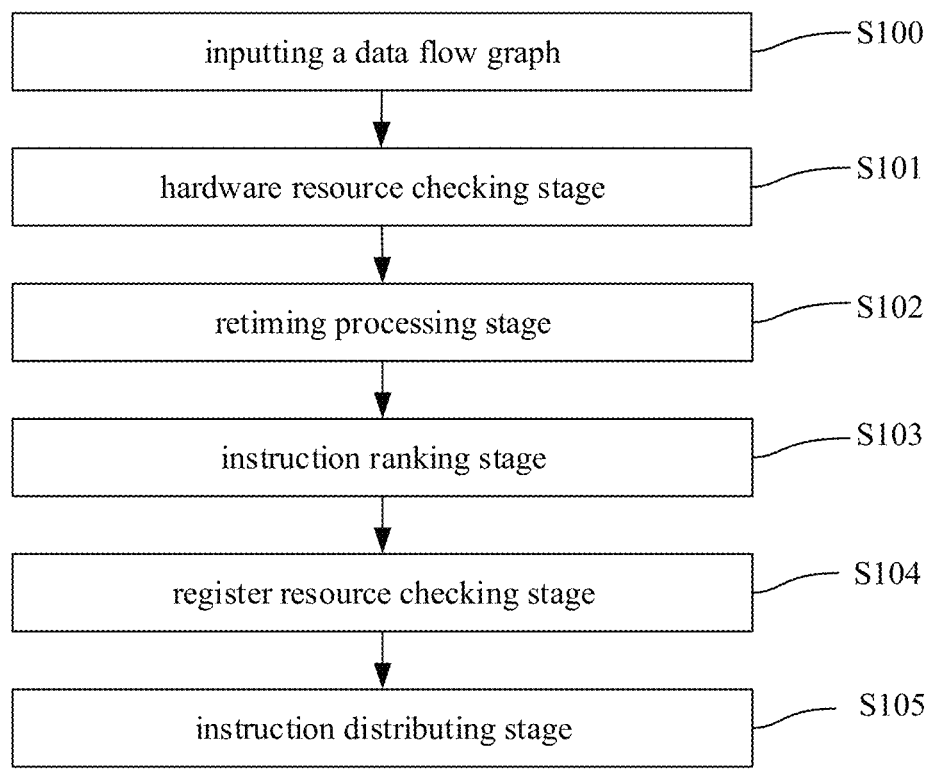
FIG. 2 is a flow chart of an instruction scheduling method according to another embodiment of the present disclosure.
Figure 3:
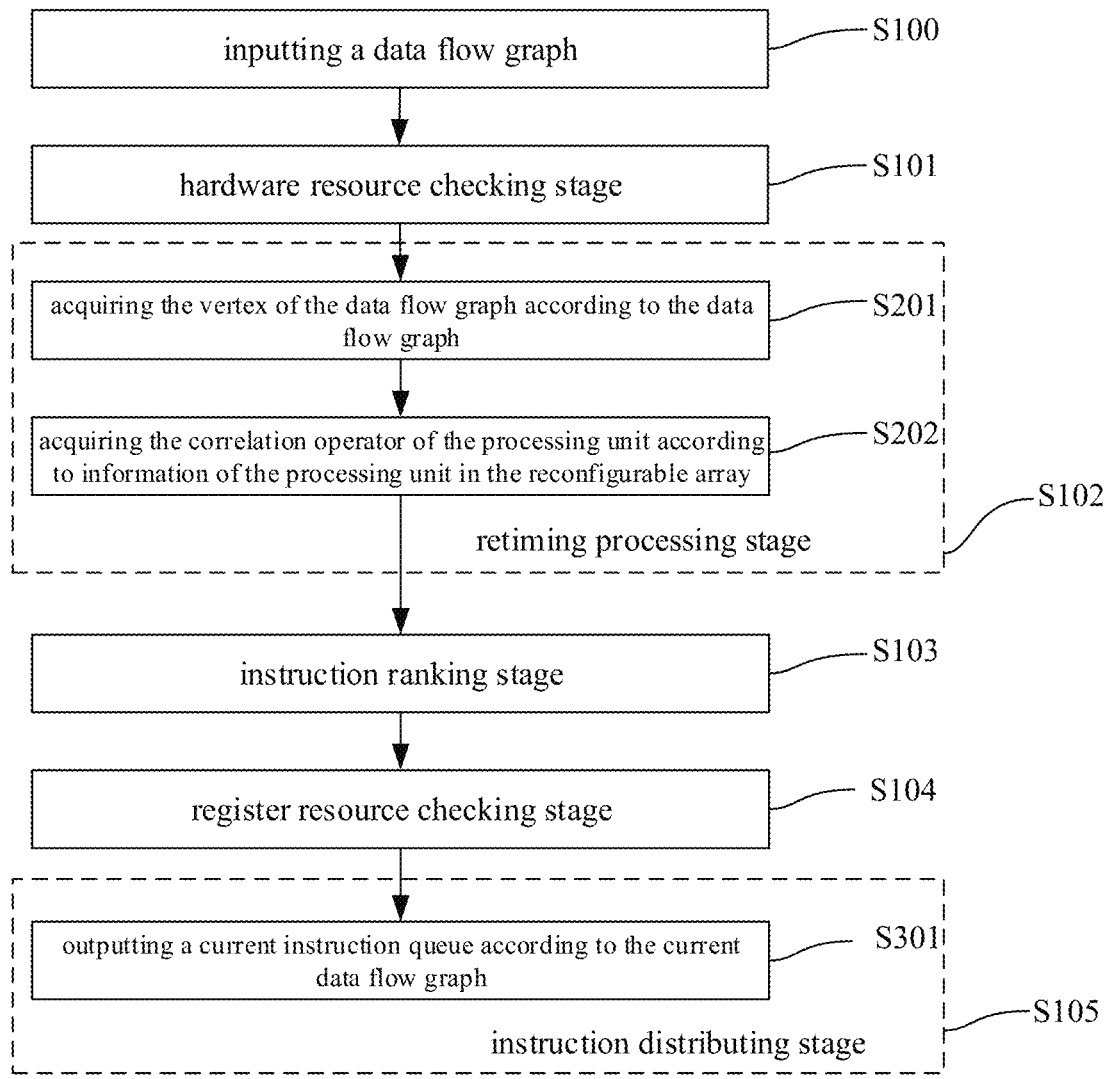
FIG. 3 is a flow chart of an instruction scheduling method according to a further embodiment of the present disclosure.

As shown in FIG. 1-3, the present disclosure provides an instruction scheduling method for a reconfigurable array processor. The method includes the following steps.

Block S101 is a hardware resource checking stage.

In S101, it is determined whether a fan-out of a vertex in a data flow graph is less than an actual interconnection number of a processing unit in a reconfigurable array. If yes, block S102 is performed, otherwise, block S101 is repeated until the fan-out of the vertex in the data flow graph is less than the actual interconnection number of the processing unit in the reconfigurable array. The vertex in the data flow graph is an instruction vertex.

Block S102 is a retiming processing stage.

In S102, a corresponding relationship between the vertex in the data flow graph and a correlation operator of the processing unit in the reconfigurable array is established, and a retiming inequality set is formed.

A register required for labeling the operator is introduced to a directed edge in the data flow graph according to a solution of the inequality set. After the register required for labeling the operator is introduced, a retiming value of each vertex in the data flow graph is acquired, to allow each vertex to be transformed into a model of the processing unit. Meanwhile, the accuracy of the program function may be ensured. In this stage, the retiming value of each vertex and the iteration interval information of the data flow graph are output.

Block S103 is an instruction ranking stage.

In S103, instructions corresponding to the instruction vertexes are arranged in such a manner that retiming values of the instruction vertexes are in ascending order, and transmission time and scheduling order of the instructions are acquired. In this way, the transmission time and the scheduling order of the instructions may be acquired quickly and the instructions having the same retiming value may be allowed to be transmitted in parallel.

Block S104 is a register resource checking stage.

In S104, the data flow graph is folded according to an initial iteration period of the data flow graph. When the number of instruction vertexes of the data flow graph transmitted in parallel at a first time is greater than the number of connected units of the processing unit in the reconfigurable array, an instruction with a smallest dependent number is placed to an instruction vertex corresponding to a time after the first time. A dependent number is the number of instructions previously transmitted.

After all times meet a constraint, when a transmission time interval between one or more instruction vertexes and a previous dependent instruction vertex thereof is greater than a preset time interval, a register is inserted before the one or more instruction vertexes and the previous dependent instruction vertex thereof, to break the dependency between them to acquire a current data flow graph. The number of registers corresponds to an iteration period and a time interval.

The data flow graph (DFG) may be referred as a data flow diagram (DFD). It graphically expresses a logical function, a logical data flow, and a logical transformation process of a system from the perspective of data transmission and processing. It serves as a stool for expressing a structured system analysis method, and is a graphical method for indicating a software model.

An iteration interval of the DFG is a time interval for the data to flow into the DFG. For DFG, a basic unit of time is a time step, and the iteration interval of the DFG is usually indicated by the number of time steps. For example, in a reconfigurable array, an iteration interval refers to a time interval for new data to flow into the array, and a basic unit usually is a clock cycle when the reconfigurable array is executed.

The larger the iteration period, the more idle clocks of the hardware, and thus more registers are required to be inserted to fill the idle clocks. The larger the time interval, the longer the delay required for the path, and thus more registers are required to be inserted to increase the delay.

Block S105 is an instruction distributing stage.

In S105, a common maximum subset of the current data flow graph and the reconfigurable array is acquired by a maximum clique algorithm according to the current data flow graph. When a maximum subset number is equal to the number of the vertexes in the data flow graph, the instructions corresponding to the instruction vertexes are distributed. The common subset represents a correspondence relationship between the instruction of the DFG and the reconfigurable array.

The maximum clique algorithm mainly constructs three sets, and it is assumed that a set R records a point that has been added in a maximal clique, a set P records a point that may still be added, and a set X records a point that has completed a maximal clique counting. In a basic maximum clique algorithm, the set P has a point v, and the point v is added in the set R. A next point that may be added into the set R is searched for in the set P and in a part of the set that is connected to the point v. When tracing back, the point v is removed from the set P and added in the set X, and it indicates that the maximal clique containing the point v has been processed at the current stage. After this program ends, if the number of nodes in the set R is equal to the number of vertexes in the DFG, a mapping is successful, otherwise, the mapping fails.

When a DFG is to be mapped on a processing element (PE) array, it is not a simple operation to map a processing vertex in a DFG to a PE because in addition to a corresponding processing operation, the PE unit also includes an input register and an output register. For a complex calculation such as multiplication and multiplication-addition, the PE unit may further include two more registers for calculation phase to increase a clock frequency.

If the DFG graph is directly mapped to the PE array, the registers in the PE may cause a transfer function of a circuit after the mapping to be different from a transfer function of the original DFG. In this case, a retiming technology may be used. The registers of the PE may be regarded as a delay number increased corresponding to edges connected to the processing vertexes after the original DFG is retimed. In order to keep the DFG function unchanged, based on a retiming theory, corresponding changes may be made to other corresponding edges. Finally, the processing vertex of the DFG becomes to a corresponding PE unit, and the edge connecting the processing vertex of the original DFG becomes an edge with zero or delay(s). This delayed edge may be transformed into an edge corresponding to a PE having a Route function and connecting input and output of the PE without delay.

Retiming is a conversion technology that changes a circuit delay element configuration without changing input and output characteristics of a system.

For example, the original DFG has two vertexes U and V and a directed edge from U to V, a delay of the edge is W(e), and a delay of the edge after retiming is Wr (e), which meets a formula of $$W_r(e) = W_e + R(V) - R(U)$$

where R( ) represents a retiming value of a corresponding point. The retiming value is calculated from a set of inequality equations and an objective function by linear programming.

Register information related to input DFG and PE processing is obtained. The required input DFG is a DFG that conforms to the meaning of the hardware circuit, that is, the directed edge should have a delay number. In addition, a processing time of a processing vertex in the DFG is regarded as 1 unit time. The register information related to the PE is op( ).out_reg_num and op( ).in_reg_num:

$$op()\cdot out\_reg\_num = op()\cdot exe\_reg\_num + 1$$

$$op()\cdot in\_reg\_num = 1$$

where op( ) represents an ALU operation corresponding to the PE, and exe_reg_num represents the number of registers inserted at an execution phase of the PE during such an operation.

Retiming conversion is performed. Since a clock cycle of the DFG after retiming may be determined as 1 time unit, a retiming constraint is a feasibility constraint:

$$op(V)\cdot in\_reg\_num + op(U)\cdot out\_reg\_num \le W(e) + R(V) - R(U),$$

that is $$R(U) - R(V) \le W(e) - op(U)\cdot out\_reg\_num - 1.$$

In addition, a minimum objective function may be established to minimize the number of registers after retiming. The objective function has a formula of $$\text{COST} = \min \sum_{edges} (R(V) - R(U)), \text{ i.e.,}$$

$$\text{COST} = \min \sum_{edges} W_r(e).$$

According to the minimized objective function and an inequality derived from a set of feasible constraints, the retiming value of each processing vertex may be calculated by using an integer linear programming method, and thus a new edge delay after the retiming may be obtained. It should be noted that after the retiming, the DFG only changes the delay of each edge, and does not merge the edges with the same delay from the same starting point. Therefore, optimization of register sharing is required after the retiming.

If it is failed to solving the retiming, the original DFG is subjected with a speed descending operation and then retimed.

An edge with a delay of the obtained new DFG is processed. After the retiming, the edge with the delay needs to be replaced with a PE which is operated as a Route and a non-delayed edge pointing to and originating from the PE. Since the Route includes at least two registers, which means at least two unit time delays. If the delay of the edge after the retiming is one unit time, this edge cannot be completely mapped to the PE, and thus the retiming of the DFG fails. The speed descending operation needs to be performed to the original DFG.

```
Software code: For(int i =0; i<10; i++)
{
  B[i]=a[i]*a[i]+a[i]-10;
}
```

The software code is a 10-dimensional vector processing operation. The input is a vector and the output is a vector. An element of the input vector perform an operation such as multiplication, addition, and subtraction to obtain an element at a corresponding position of the output vector.

In a data flow graph, several paths may start from a same vertex, after passing through different vertexes, ends at a same vertex at the same time. In this case, when the data flow graph is converted into instructions and mapped to a reconfigurable array, inconsistent path delay may occur, which will cause the vertex at the path end to not receive the data correctly.

Figure 4:
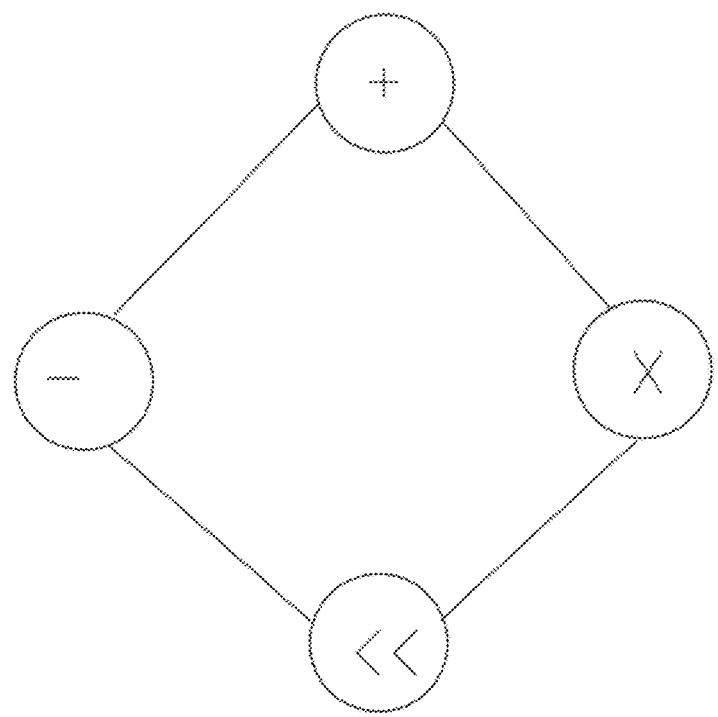
FIG. 4 is a schematic diagram of a data flow generated by an instruction scheduling system according to an embodiment of the present disclosure.
Figure 5:
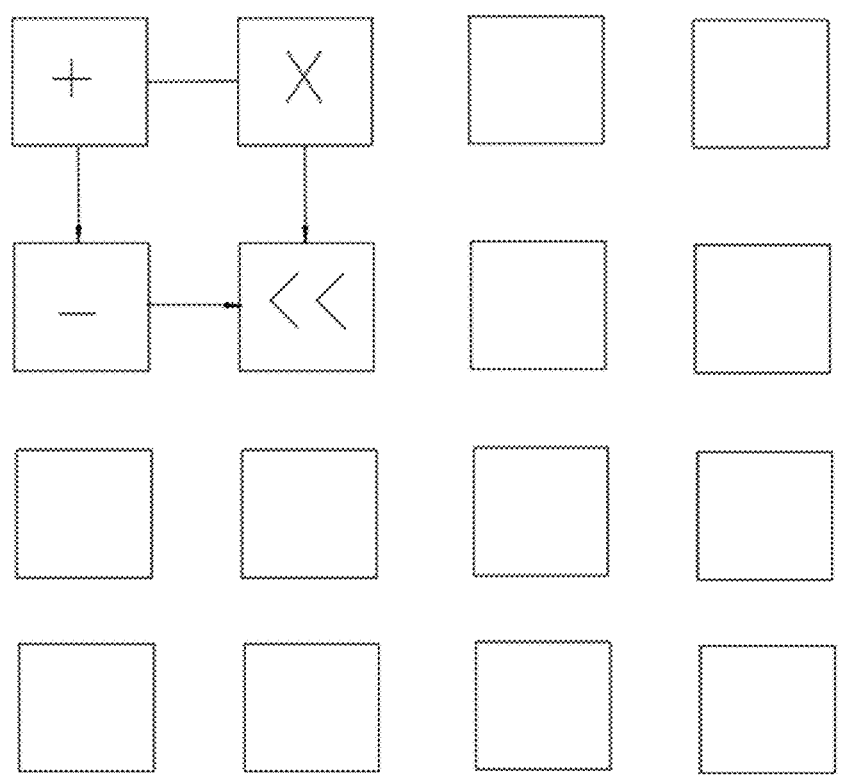
FIG. 5 is a schematic diagram showing a mapping result of an instruction scheduling system according to an embodiment of the present disclosure.

As shown in FIG. 4, starting from an addition vertex, there are two paths ending at the left shift vertex at the same time. FIG. 5 shows a mapping result in a case where all vertexes have the same processing time. However, in actual situations, the operation time of the multiplication vertex may be greater than that of the subtraction vertex. At this time, delays of the two paths are inconsistent, and a route instruction needs to be added to the path with a shorter delay to make the delays of the two paths the same.

Figure 6:
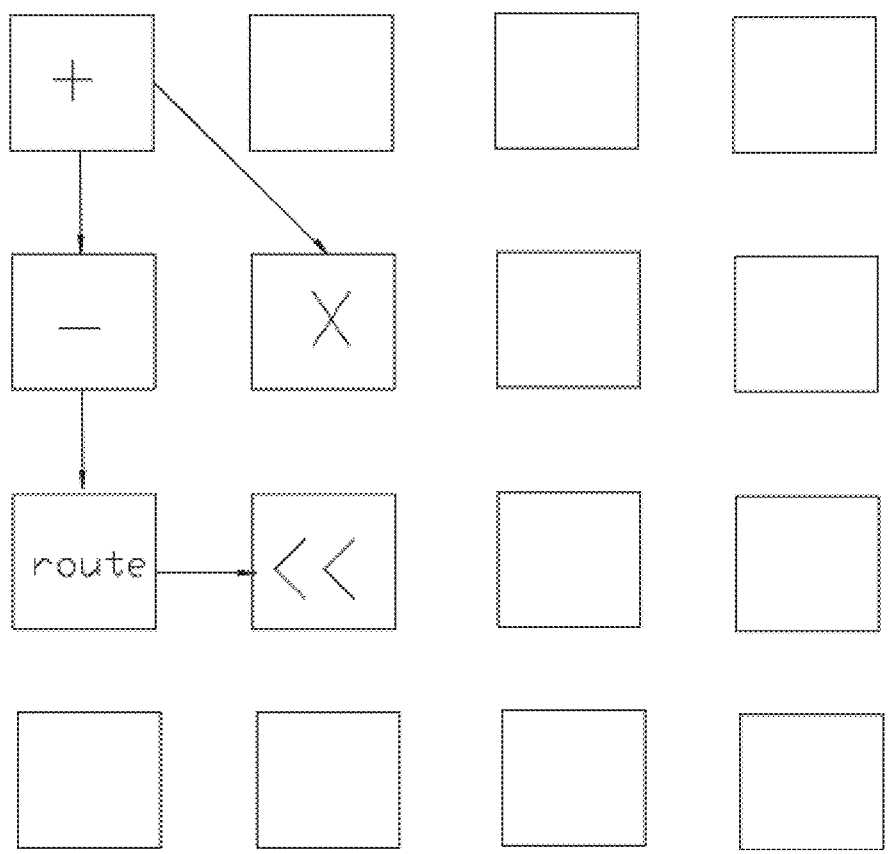
FIG. 6 a schematic diagram showing an automatic processing of a path delay conflict of a data flow graph by an instruction scheduling system according to an embodiment of the present disclosure.

As shown in FIG. 6, in the present disclosure, the retiming algorithm is used to check the path delay conflict in the data flow graph and the routing instruction is added without changing the semantic of the data flow graph, to realize the automatic processing of the path delay conflict problem in the data flow graph.

An input of a scheduling method for a reconfigurable array of the present disclosure is a data flow graph generated by a software algorithm. In the scheduling method for the reconfigurable array of the present disclosure, it is firstly checked whether the data flow graph conforms to the hardware constraint of the reconfigurable array. If it conforms to the hardware constraint, it meets the PE resource constraint and the PE's fan-out constraint of the hardware. The retiming is used to process the data flow graph, and the instructions to be issued are sequenced. The instructions issued at the same time are checked for the hardware resource constraint. If the DFG vertex is greater than the hardware resource, the DFG will be clipped.

If the PE's fan-out constraint is not met, the original vertex will be copied for multiple points, and the fan-out will be shared equally until the fan-out constraint is satisfied. After the hardware resource constraint check is completed, the data flow graph will be checked for the register resource constraint, one or more routing instructions are inserted in the interval of transmitting the instructions to ensure the correctness of the function executed. The maximum clique algorithm is used to find the location of the processing unit corresponding to each instruction, and the instructions are distributed.

For example, there is an undirected graph, and a clique is a subgraph of this graph, and all vertices in the subgraph are connected by edges. The maximal clique refers to a clique that is not included in any other cliques in the graph, that is, it is not a true subset of any other clique. The maximum clique refers to a maximal clique with the largest number of vertexes. The maximum clique algorithm may be a Bron-Kerbosch backtracking algorithm. The maximum clique algorithm may be an open source method, which is not described in detail herein.

According to the embodiments of the present disclosure, whether the data flow graph meets the hardware constraints of the reconfigurable array is checked, the data flow graph is processed by using the retiming technology, and arranging the sequence of transmitting the instructions, and the instructions transmitted at the same time are checked for the hardware resource constraint. After the hardware resource constraint check, the data flow graph is checked for the register resource constraint. A routing instruction is inserted in the interval of instruction transmission to ensure the correctness of the executed function. The maximum clique algorithm is used to find the location of the processing unit corresponding to each instruction. The completion of instruction distribution simplifies the execution process of the scheduling algorithm, improves the performance of the instruction scheduling algorithm, and enhances the versatility of the instruction scheduling algorithm, thus improving the compatibility of the operators of different cycles and improving the efficiency of the register and the routing unit.

Based on the above technical solution of the present disclosure, other embodiments may be further described as follows.

In an embodiment, before S101, the present method includes: S100, inputting the data flow graph.

In this step, the data flow graph is input. The data flow graph is a graph data structure containing operation instructions and dependencies between the instructions. The operation instruction constitutes the vertex of the data flow graph, and the dependency forms the directed edge of the data flow graph.

In an embodiment, S102 further includes: S201, acquiring the vertex of the data flow graph according to the data flow graph, and S202, acquiring the correlation operator of the processing unit according to information of the processing unit in the reconfigurable array.

In an embodiment, the preset time interval is in a range of 1 s to 2 s.

In an embodiment, S105 further includes: S301, outputting a current instruction queue according to the current data flow graph.

The present disclosure provides an instruction scheduling system for a reconfigurable array processor. A scene for this system is that a data flow graph generated by software codes is converted into a computer instruction, and is mapped on the processing element of the reconfigurable array. The system includes: a hardware resource checking unit, a retiming processing unit, an instruction ranking unit, a resource checking unit, and an instruction distributing unit.

The hardware resource checking unit is configured to determine whether a fan-out of a vertex in a data flow graph is less than an actual interconnection number of a processing unit in a reconfigurable array. If yes, block S102 is performed, otherwise, block S101 is repeated until the fan-out of the vertex in the data flow graph is less than the actual interconnection number of the processing unit in the reconfigurable array. The vertex in the data flow graph is an instruction vertex.

The retiming processing unit is configured to establish a corresponding relationship between the vertex in the data flow graph and a correlation operator of the processing unit in the reconfigurable array, and form a retiming inequality set, and introduce a register required for labeling the operator to a directed edge in the data flow graph according to a solution of the inequality set, acquire a retiming value of each vertex in the data flow graph, to allow each vertex to be transformed into a model of the processing unit.

The instruction ranking unit is configured to arrange instructions corresponding to the instruction vertexes in such a manner that retiming values of the instruction vertexes are in ascending order, and acquire transmission time and scheduling order of the instructions.

The resource checking unit is configured to fold the data flow graph according to an initial iteration period of the data flow graph, and in response to the number of instruction vertexes of the data flow graph transmitted in parallel at a first time being greater than the number of connected units of the processing unit in the reconfigurable array, place an instruction with a smallest dependent number to an instruction vertex corresponding to a time after the first time, in which a dependent number is the number of instructions previously transmitted, and if all times meet a constraint, in response to a transmission time interval between one or more instruction vertexes and a previous dependent instruction vertex thereof being greater than a preset time interval, insert a register before the one or more instruction vertexes and the previous dependent instruction vertex thereof and acquire a current data flow graph, in which the number of registers corresponds to an iteration period and a time interval.

The instruction distributing unit is configured to acquire a common maximum subset of the current data flow graph and the reconfigurable array by a maximum clique algorithm according to the current data flow graph, and distribute the instructions corresponding to the instruction vertexes in response to a maximum subset number being equal to the number of the vertexes in the data flow graph.

In an embodiment, the hardware resource checking unit is further configured to input the data flow graph. The data flow graph is a graph data structure containing operation instructions and dependencies between the instructions, the operation instruction constitutes the vertex of the data flow graph, and the dependency forms the directed edge of the data flow graph.

In an embodiment, the retiming processing unit is further configured to acquire the vertex of the data flow graph according to the data flow graph; and acquire the correlation operator of the processing unit according to information of the processing unit in the reconfigurable array.

In an embodiment, the preset time interval is in a range of 1 s to 2 s.

In an embodiment, the instruction distributing unit is further configured to output a current instruction queue according to the current data flow graph.

It should be noted that all of the above described features and advantages for the instruction scheduling method as described above are also applicable to the system, which will not be elaborated in detail herein.

The present disclosure provides in embodiments a non-transitory computer-readable storage medium having stored therein instructions that, when executed by a processor, are configured to perform the present method as described above.

It should be noted that various embodiments or examples described in the specification, as well as features of such the embodiments or examples, may be combined without conflict. Besides above examples, any other suitable combination should be regarded in the scope of the present disclosure.

Reference throughout this specification to "an embodiment", "some embodiments", "one embodiment", "another example", "an example", "a specific example" or "some examples" means that a particular feature, structure, material, or characteristic described in connection with the embodiment or example is included in at least one embodiment or example of the present disclosure. Thus, the appearances of the phrases such as "in some embodiments", "in one embodiment", "in an embodiment", "in another example", "in an example" "in a specific example" or "in some examples" in various places throughout this specification are not necessarily referring to the same embodiment or example of the present disclosure. Furthermore, the particular features, structures, materials, or characteristics may be combined in any suitable manner in one or more embodiments or examples.

It should be noted that, in this context, relational terms such as first and second are used only to distinguish an entity from another entity or to distinguish an operation from another operation without necessarily requiring or implying that the entities or operations actually have a certain relationship or sequence. Moreover, "include", "include" or other variants are non-exclusive, thus a process, a method, an object or a device including a series of elements not only include such elements, but also include other elements which may not mentioned, or inherent elements of the process, method, object or device. If there is no further limitation, a feature defined by an expression of "include a . . . " does not mean the process, the method, the object or the device can only have one elements, same elements may also be included.

It should be noted that, although the present disclosure has been described with reference to the embodiments, it will be appreciated by those skilled in the art that the disclosure includes other examples that occur to those skilled in the art to execute the disclosure. Therefore, the present disclosure is not limited to the embodiments.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which may not follow a shown or discussed order according to the related functions in a substantially simultaneous manner or in a reverse order, to perform the function, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system including processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium include but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs include one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc.

Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. An instruction scheduling method for a reconfigurable array processor, comprising:
    determining whether a fan-out of a vertex in a data flow graph is less than an actual interconnection number of a processing unit in a reconfigurable array, wherein the vertex in the data flow graph is an instruction vertex;
    establishing a corresponding relationship between the vertex in the data flow graph and a correlation operator of the processing unit in the reconfigurable array, and forming a retiming inequality set, in response to the fan-out of the vertex in the data flow graph being less than the actual interconnection number of the processing units in the reconfigurable array;
    introducing a register required for labeling the correlation operator to a directed edge in the data flow graph according to a solution of the inequality set, acquiring a retiming value of each vertex in the data flow graph, to allow each vertex to be transformed into a model of the processing unit;
    arranging instructions corresponding to the instruction vertexes in such a manner that retiming values of the instruction vertexes are in ascending order, and acquiring transmission time and scheduling order of the instructions;
    folding the data flow graph according to an initial iteration period of the data flow graph, and in response to the number of instruction vertexes of the data flow graph corresponding to instructions to be transmitted in parallel at a first time being greater than the number of connected units of the processing unit in the reconfigurable array, placing an instruction with a smallest dependent number to an instruction vertex corresponding to a second time after the first time, wherein a dependent number is the number of instructions previously transmitted;
    in response to determining that the number of instruction vertexes corresponding to instructions to be transmitted in parallel at each time is smaller than or equal to the number of connected units of the processing unit in the reconfigurable array, and in response to a transmission time interval between one or more instruction vertexes and a previous dependent instruction vertex thereof being greater than a preset time interval, inserting a register before the one or more instruction vertexes and the previous dependent instruction vertex thereof and acquiring a current data flow graph, wherein the number of registers corresponds to an iteration period and a time interval; and
    acquiring a common maximum subset of the current data flow graph and the reconfigurable array by a maximum clique algorithm according to the current data flow graph, and distributing the instructions corresponding to the instruction vertexes in response to a maximum subset number being equal to the number of the vertexes in the data flow graph.

2. The instruction scheduling method according to claim 1, further comprising:
    inputting the data flow graph, wherein the data flow graph is a graph data structure containing operation instructions and dependencies between the instructions, the operation instruction constitutes the vertex of the data flow graph, and the dependency forms the directed edge of the data flow graph.

3. The instruction scheduling method according to claim 1, wherein establishing the corresponding relationship between the vertex in the data flow graph and the correlation operator of the processing unit in the reconfigurable array comprises:
    acquiring the vertex of the data flow graph according to the data flow graph; and
    acquiring the correlation operator of the processing unit according to information of the processing unit in the reconfigurable array.

4. The instruction scheduling method according to claim 1, wherein the preset time interval is in a range of 1 s to 2 s.

5. The instruction scheduling method according to claim 1, wherein distributing the instructions corresponding to the instruction vertexes comprises: outputting a current instruction queue according to the current data flow graph.

6. An instruction scheduling system for a reconfigurable array processor, comprising:
    a hardware resource checking unit, configured to determine whether a fan-out of a vertex in a data flow graph is less than an actual interconnection number of a processing unit in a reconfigurable array, wherein the vertex in the data flow graph is an instruction vertex;

a retiming processing unit, configured to:

establish a corresponding relationship between the vertex in the data flow graph and a correlation operator of the processing unit in the reconfigurable array, and form a retiming inequality set, and introduce a register required for labeling the correlation operator to a directed edge in the data flow graph according to a solution of the inequality set, acquire a retiming value of each vertex in the data flow graph, to allow each vertex to be transformed into a model of the processing unit;

an instruction ranking unit, configured to arrange instructions corresponding to the instruction vertexes in such a manner that retiming values of the instruction vertexes are in ascending order, and acquire transmission time and scheduling order of the instructions;

a resource checking unit, configured to:

fold the data flow graph according to an initial iteration period of the data flow graph, and in response to the number of instruction vertexes of the data flow graph corresponding to instructions to be transmitted in parallel at a first time being greater than the number of connected units of the processing unit in the reconfigurable array, place an instruction with a smallest dependent number to an instruction vertex corresponding to a second time after the first time, wherein a dependent number is the number of instructions previously transmitted, and in response to determining that the number of instruction vertexes of the data flow graph corresponding to instructions to be transmitted in parallel at each time is smaller than or equal to the number of connected units of the processing unit in the reconfigurable array, and in response to a transmission time interval between one or more instruction vertexes and a previous dependent instruction vertex thereof being greater than a preset time interval, insert a register before the one or more instruction vertexes and the previous dependent instruction vertex thereof and acquire a current data flow graph, wherein the number of registers corresponds to an iteration period and a time interval; and an instruction distributing unit, configured to acquire a common maximum subset of the current data flow graph and the reconfigurable array by a maximum clique algorithm according to the current data flow graph, and distribute the instructions corresponding to the instruction vertexes in response to a maximum subset number being equal to the number of the vertexes in the data flow graph.

7. The instruction scheduling system according to claim 6, wherein the hardware resource checking unit is further configured to input the data flow graph, wherein the data flow graph is a graph data structure containing operation instructions and dependencies between the instructions, the operation instruction constitutes the vertex of the data flow graph, and the dependency forms the directed edge of the data flow graph.

8. The instruction scheduling system according to claim 6, wherein the retiming processing unit is further configured to acquire the vertex of the data flow graph according to the data flow graph; and acquire the correlation operator of the processing unit according to information of the processing unit in the reconfigurable array.

9. The instruction scheduling system according to claim 6, wherein the preset time interval is in a range of 1 s to 2 s.

10. The instruction scheduling system according to claim 6, wherein the instruction distributing unit is further configured to output a current instruction queue according to the current data flow graph.

11. A non-transitory computer-readable storage medium having stored therein instructions that, when executed by a processor, are configured to perform the instruction scheduling method according to claim 1.

* * * * *